United States Patent
Thaxter

[15] 3,652,145
[45] Mar. 28, 1972

[54] ELECTRICALLY CONTROLLABLE VOLUME HOLOGRAPHIC APPARATUS AND METHOD FOR OPERATING SAID APPARATUS

[72] Inventor: James B. Thaxter, Townsend, Mass.
[73] Assignee: Sperry Rand Corporation
[22] Filed: June 30, 1969
[21] Appl. No.: 837,665

[52] U.S. Cl. ............................... 350/3.5, 350/150
[51] Int. Cl. .......................................... G02b 27/00
[58] Field of Search ............ 350/3.5, 150, 160; 340/173.2; 271/219 QA, 219 D

[56] References Cited

UNITED STATES PATENTS

| | | | |
|---|---|---|---|
| 3,475,736 | 10/1969 | Kurtz | 350/150 |
| 3,492,492 | 1/1970 | Ballman et al. | 350/150 |
| 3,544,189 | 12/1970 | Chen et al. | 350/3.5 |
| 3,518,634 | 6/1970 | Ballman et al. | 350/150 |

OTHER PUBLICATIONS

Chen et al., Applied Physics Letters, Vol. 13, No. 7, Oct. 1968, pp. 223–5.
Ashkin et al., Applied Physics Letters, Vol. 9, No. 1, July 1966 pp. 72–74.

*Primary Examiner*—David Schonberg
*Assistant Examiner*—Ronald J. Stern
*Attorney*—S. C. Yeaton

[57] ABSTRACT

An electrically controllable volume holographic storage apparatus comprising a ferroelectric crystalline member having electrodes affixed thereto for establishing an electric field in the member, the electric field being operative in the process of constructing the hologram both to increase the sensitivity of the crystal to light beams incident thereon and to optimize the efficiency of the holographic grating, and further operative, in the process of reconstructing the image, for controllably adjusting the intensity of said image.

14 Claims, 1 Drawing Figure

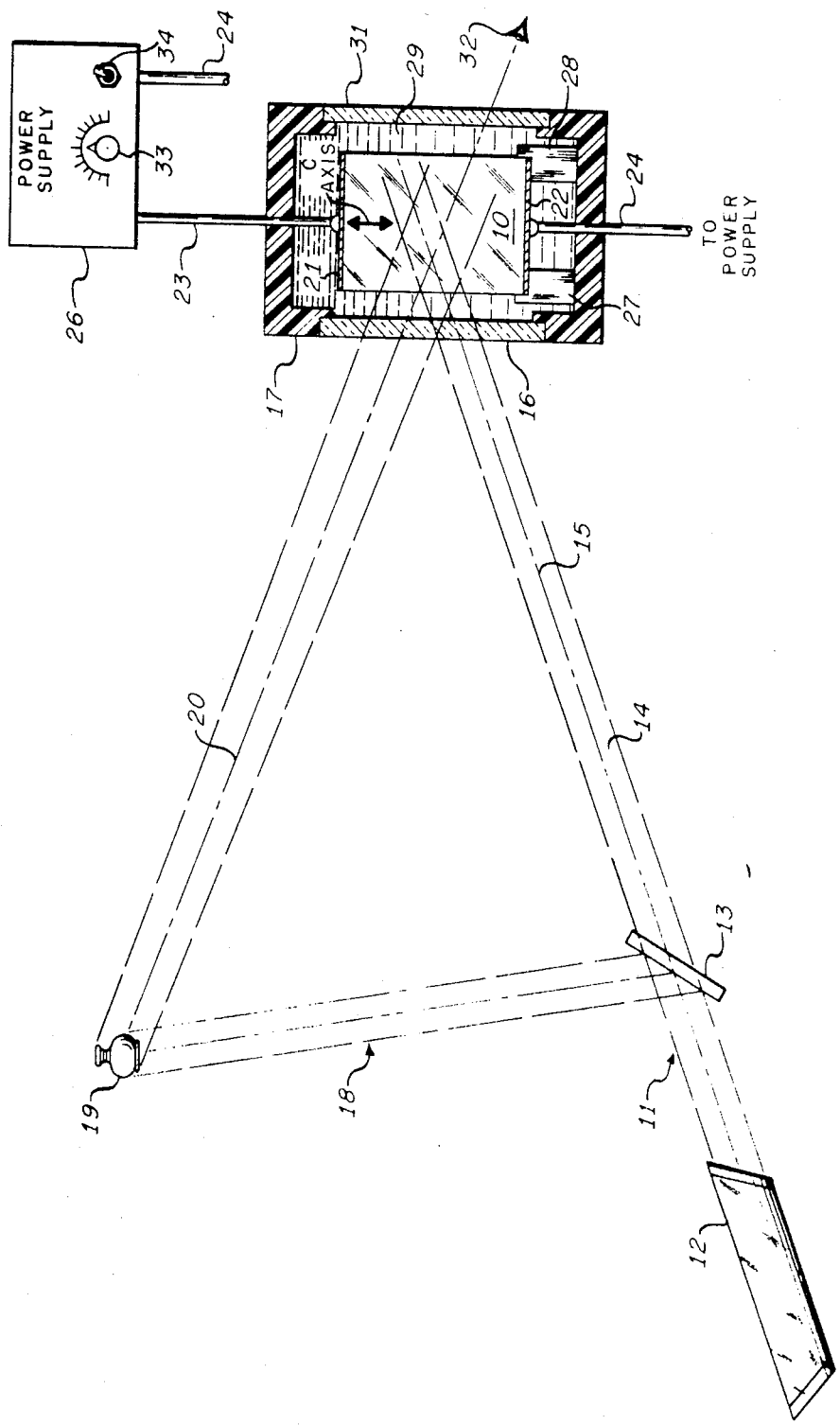

ELECTRICALLY CONTROLLABLE VOLUME HOLOGRAPHIC APPARATUS AND METHOD FOR OPERATING SAID APPARATUS

BACKGROUND OF THE INVENTION

1. Field of the Invention

The present invention relates to holographic devices and more particularly to an electrically controllable volume holographic apparatus.

A hologram is basically a diffraction grating formed on a suitable recording medium, such as a photographic film, by the interference between two coherently related incident light beams preferably derived from a common light source and arranged so as to be superimposed on the recording medium. One beam is commonly referred to as a reference beam and the other as a signal or object beam. In the course of forming the holographic diffraction pattern, an object, of which an image is to be obtained, is disposed in the path of the signal beam so that the object intercepts said beam before it impinges on the recording medium. The object may be, for example, a film transparency through which the signal beam is transmitted or a three-dimensional object from which the signal beam is reflected or scattered onto the recording medium. Each incremental area of the hologram will then contain information from all points of the object visible from that area and thus corresponds to a particular view of the object. In the case of three-dimensional objects a light source having a high degree of monochromaticity or good temporal coherence is required to avoid distortion in the depth presentation of the reconstructed image. A laser source is essential therefore for three-dimensional presentations and is generally preferred in any event to obtain bright, high quality images.

After the holographic diffraction pattern has been recorded in the aforedescribed manner and the film processed in accordance with conventional techniques, an image of the recorded object is provided simply by illuminating the developed film with a reference beam in the absence of both the signal beam and the object which has been recorded. Although it is not essential for reconstructing the image, the best results are usually obtained when the reference beam has the same wavelength, propagational direction and angle of incidence as were used for making the hologram. Under such conditions, the reference beam will be diffracted by the hologram with most of the light energy concentrated in the first order diffraction lobe, thereby forming a virtual image of the object which can be observed by a viewer looking through the recording medium from a given position on the side opposite the reference beam and appropriately angularly displaced therefrom. As the position of the observer is altered slightly from the given position the image will appear in different perspective. The extent of permissible movement is, of course, limited by the aperture (size of the hologram), which in the present state of the art is quite small and consequently imposes a limit on both the viewing range and number of observers.

A real image is also produced by the hologram in a first order diffraction lobe located on the side of the film remote from the virtual image. To date, most interest has centered on the virtual image since the real image is pseudoscopic, that is, it is an inverted presentation of the object wherein protrusions on the object appear as indentations on the image and so forth. It should be noted, however, that a natural (non-pseudoscopic) real image can be provided by propagating the reference beam during reconstruction (image formation) from the direction opposite to that used in forming the hologram. This permits the image to be recorded on a viewing screen but generally there is not much advantage in doing this in the case of a three-dimensional object unless some form of three-dimensional light diffusive medium is used as a viewing screen.

2. Description of the Prior Art

In the present state of the art, ordinary photographic film is the most commonly used recording medium. Photochromic materials in both film and volume form have also been investigated and more recently the formation of holographic diffraction gratings in crystalline members has been disclosed in *Applied Physics Letters*, Volume 13, No. 7, page 223, "Holographic Storage in Lithium Niobate." In all cases, the holograms are classified as thin or thick in accordance with the resolution (fringe spacing of the interference pattern) of the recorded detail relative to the thickness of the recording medium. When the recorded detail considerably exceeds the thickness of the recording medium, the hologram is said to be thick. Since the recorded detail increases as the angle between the reference and signal beams increases, a photographic film, having an emulsion thickness typically of about 15 microns, becomes a thick medium when the angle between the reference and signal beams is approximately 10° or more. A volume holographic medium such as a crystal, on the other hand, falls into the thick classification for angular separations on the order of a fraction of a degree or more.

In addition to the thin-thick classification, holograms are also classified as absorption or phase type depending upon whether the diffraction lobes which they produce, when illuminated by a light beam, are established by selective absorption or selective phase retardation of the illuminating beam. It can be intuitively appreciated that absorption holograms are less efficient than phase holograms in that they focus a lower percentage of the incident illuminating beam into the first order diffraction lobe simply because part of the energy in the illuminating beam is absorbed whereas very little or no absorption occurs in phase holograms. As a result, phase holograms are generally preferred because of their greater efficiency. A completely satisfactory method for developing phase holograms in photographic film has not yet been developed, however. As a consequence, although high efficiency has been realized, the image quality has been rather poor because of considerable distortion in the reconstructed image. This limitation is circumvented in the case of the aforementioned crystal holographic media. In these devices a pure-phase grating is inherently formed, without the necessity for processing or developing, by localized refractive index inhomogeneities which are optically induced in the crystal in response to reference and signal beams incident thereon.

The crystalline holographic media disclosed in the aforementioned *Applied Physics Letters* article, namely, lithium niobate and lithium tantalate, are characterized by a limited spectral response range and low sensitivity. As a result, extremely super-imposed beams are required to induce refractive index inhomogeneities of sufficient amplitude to construct a well-defined phase hologram. Moreover, it is indicated that the maximum amplitude of the refractive index inhomogeneities, assuming infinite exposure time, is proportional to the square root of the beam intensities while for amplitudes less than maximum the change of refractive index is dependent on the product of beam intensity and exposure time. Consequently, unless the exposure time is made extremely long, the results are far from optimum even when a high power light source, such as an argon-ion laser, is used to construct the hologram. In addition, it is known that the holographic diffraction efficiency is dependent, among other factors, upon the amplitude of the refractive index changes and as a result the intensity of the reconstructed images is impaired by the comparatively low sensitivity of the prior art volume holographic devices.

SUMMARY OF THE INVENTION

The aforementioned limitations of prior art devices are overcome in the present invention by the provision of a ferroelectric crystalline member having electrodes affixed thereto for establishing an electric field in the crystal. More specifically, a poled, ferroelectric crystal of strontium barium niobate (SBN) is disposed in the path of reference and signal beams emitted from a laser source. During the process of forming the holographic diffraction grating in the crystal an electric field is established therein, preferably oriented in a direction transverse to the direction of light propagation. The electric field operates to increase both the spectral response band and the sensitivity of the crystal. This result obtains because the maximum amplitude of the optically induced refractive index inhomogeneities is dependent primarily on the electric field strength rather than the light beam intensity as in the case of the prior art crystalline holographic devices. Thus, low power lasers, such as a helium-neon laser, provide light of sufficient intensity for forming a diffraction grating of high efficiency in a volume holographic device constructed according to the principles of the present invention. In general, the required electric field strengths are easily realized, but in those applications where extremely high voltages are used it is preferably to immerse the crystal in a dielectric medium to prevent inter-electrode arcing around the crystal.

Once the phase hologram is formed in the crystal the image is reconstructed as hereinbefore explained by illuminating the crystal with a reference beam. In this instance, however, it is not necessary to perform any developing or processing prior to reconstruction, as in the case of photographic film, since the holographic grating is intrinsically developed and retained in the crystal as a direct consequence of the interference therein between the reference and signal beams.

A further unique feature of the present invention is the capability for controlling the intensity of the reconstructed image by varying the strength of the applied electric field, the image brightness being greatest when the electric field strength during reconstruction is approximately equivalent to that used in constructing the hologram. As the filed strength is reduced, the image brightness decreases correspondingly until eventually it disappears when the electric field approaches zero or becomes slightly negative. Subsequent reapplication of the electric field restores the image. Thus, the process is reversible with the image intensity decreasing and increasing proportionately in response to corresponding changes in the amplitude of the applied electric field. MOreover, the hologram can be thermally erased as in the case of the prior art devices simply by heating the crystal to a prescribed temperature, 170° C., for example, in the case of lithium niobate.

BRIEF DESCRIPTION OF THE DRAWINGS

The sole figure is a side elevational view of preferred embodiment of an electrically controllable volume holographic apparatus.

DESCRIPTION OF THE PREFERRED EMBODIMENT

Referring to the FIG., for the purpose of constructing a holographic diffraction grating in crystal 10, a plane polarized light beam 11 oriented in the plane of the drawing is provided by laser 12 for partial transmission through beam splitter 13 to form reference beam 14 which propagates onto the crystal directly through optical window 16 in plastic casing 17. The remaining portion of the energy in light beam 11 is reflected from beam splitter 13 to form signal beam 18 which is reflected or scattered from object 19 onto the crystal in at least partially overlapping or super-imposed relation therein with reference beam 13. As indicated in the drawing, the central axes 15 and 20 of the reference and signal beams lie in a plane which includes the C axis of the crystal. An electric field oriented parallel to the crystalographic C axis is established in crystal 10 by means of silver electrodes 21 and 22 painted on opposite sides thereof and connected by leads 23 and 24 respectively passing through casing 17 to power supply 26.

Struts 27 and 28 connected a their respective ends to the crystal and casing support the crystal in fluid bath 29 enclosed in the casing. Dow-Corning Silastic 732 RTV Adhesive cement is suitable for making such connections. The function of the fluid is to preclude electrode arcing around the exterior surfaces of the crystal under conditions of high electric field intensity. A dielectric substance such as Dow-Corning 550 Fluid or any medium of much lower conductivity than the crystal can be used for this purpose. In addition, the fluid should, of course, be optically transparent to minimize light absorption and preferably have a refractive index approximately equal to that of the crystalline member and optical window members 16 and 31 in order to minimize reflection loses at the interfaces between the fluid bath and said members.

As hereinbefore explained, interference in the crystal between the reference and signal beams produces a stationary intensity distribution which induces localized changes in the index of refraction, commonly referred to as refractive index inhomogeneities. The inhomogeneities spatially modulate the refractive index pattern of the crystal and constitute a phase hologram. It is believed that the inhomogeneities are caused by the migration of space charges of photo excited electrons. These charges are normally stationary, but under the force of the electric field, they tend to drift out of regions of high optical intensity and become trapped in regions of low optical excitation. The internal fields resulting from this distribution of trapped charges produces the spatial modulation of the refractive index. It has been observed that this effect, that is, distribution of trapped charges, is substantially enhanced by the application of an electric field, thereby yielding crystalline holographic storage devices of high efficiency and broad spectral responsivity in a range extending from the near infrared through the visible into the ultraviolet.

The depicted orientation of the crystalographic C axis and electric field relative to the reference and signal beams represent the presently preferred inter-relationship of these factors in the case of a medium of $Sr_xBa(1-)Nb_2O_6$ $0.75 > x > 0.25$) for the purpose of obtaining reconstructed holographic images of high efficiency and good quality. It should be understood, however, that apparatus operating in accordance with the principles of the invention can also be obtained with other relative orientations between the applied field, crystal C axis and incident light beams. Also, as in the case of prior art holographic devices, a plurality of gratings can be stored in the crystal simultaneously simply by changing the wavelength and/or the angles of incidence of the coherently related signal and reference beams using well-known principles of volume holography. Further, it should be noted that inasmuch as the magnitude of the induced refractive index variations are substantially independent of the polarization of the reference and signal beams, any polarization may be used to form the hologram. However, holograms recorded with the polarization of the incident reference and signal beams different from the polarization of the reconstructing reference beam will require special consideration as to the direction and polarization of the reconstructing reference beam necessary to reconstruct the image in accordance with conventional holographic techniques.

Once the holographic grating has been formed in the crystal in the foregoing manner, an image of the object can be reconstructed by illuminating the crystal solely with the reference beam in the absence of the object and signal beam. Then an observer located at position 32 along the extension of central axis 20 an appropriate distance from the crystal sees a virtual image of the object at the position originally occupied by object 19. To enhance the reconstructed image the reference beam is preferably extraordinarily poled, that is, plane polarized parallel to the extraordinary index of the index ellipsoid associated with the birefringent crystalline material. Other polarization orientations can be used in the reconstruction process but only at the expense of a concomitant degradation of the reproduced image. The intensity of the image is brightest when the electric field strength during the reconstruction process is substantially equal to that used for constructing the hologram. As the electric field intensity is decreased by turning knob 33 on power supply 26 to reduce the voltage applied to electrodes 21 and 22, the image intensity decreases correspondingly. At some point close to zero field intensity or under conditions of small reverse field, effected by means of switch 34 on power supply 26 for changing the polarity of the voltage applied to the electrodes, the image is no longer visible. When the field is reapplied with its original polarity, the image reappears and reaches maximum intensity once again when the field strength is substantially equal to that used in the recording process.

The selected crystal should be one in which the index changes are highly localized to assure high resolution and compact information storage. Strontium barium niobate, having a composition $Sr_xBa_{1-x}Nb_2O_6$, where x preferably has a range of values from 0.25 to 0.75, has been found to provide particularly satisfactory results. More specifically, efficiencies up to 2 percent have been obtained with cube shaped single crystals of $Sr_{.75}Ba_{.25}Nb_2O_6$ measuring approximately 0.3 centimeter along each dimension under an applied field of $10^4$ volts per centimeter and optical intensities of 0.04 watts per square centimeter at a wavelength of 633 microns.

A general requirement of the storage medium is that it be a polar material, that is, one which can be poled or have its spontaneous electric polarization aligned with reference to an axis dictated by the crystallographic structure, under the influence of an electric field and appropriate temperature. In the case of strontium barium niobate the polar axis, or axis of polarization, corresponds to the C axis of the crystal. A further general requirement of the material is that it must be susceptible to having refractive index inhomogeneities induced therein by electro optical means.

Materials which are capable of being poled are commonly referred to as being ferroelectric. Ferroelectric materials have a nonlinear relation between the electric polarization and the applied electric field and also exhibit hysteresis. In some materials such as strontium barium niobate, the polarization magnitude and orientation can be affected at normal ambient temperatures of about 250° C.; but in others, for example, lithium niobate, the crystal must first be heated to about 1,000° C. or more before the applied field can orient the spontaneous polarization. The latter type of materials are sometimes referred to as "frozen in" ferroelectric. The polarization versus applied electric field relation of the ferroelectric, strontium barium niobate, exhibits a nonlinearity over the range of electric field and temperature used by this device for the electrical control of the holographic reconstruction process. This non-linearity is believed to be substantially responsible for the large effect the electric field has on the intensity of the reconstructed image. It should be understood, however, that this non-linearity is essential only when it is desired to achieve electrical control during the reconstruction process. If electrical control is required only during the recording process, the aforementioned non-linearity is not an essential characteristic of the storage medium. In any event, irrespective of the crystal material that is used, optimum holographic results are obtained when the electric field is oriented with respect to the crystallographic axes of symmetry of the crystal. The orientation of electric field will depend on the symmetry of the crystal material used and the relating magnitude of the electro-optic coefficients used to describe the optical characteristics of the material in accordance with the well-known principles of crystal optics.

While the invention has been described in its preferred embodiment, it is to be understood that the words that have been used are words of description rather than limitation.

I claim

1. A volume holographic apparatus comprising
   a polar crystalline member of strontium barium niobate having the characteristic that coherently related reference and signal light beams angularly displaced from one another and incident on said crystalline member in at least partially super-imposed relationship establish refractive index inhomogeneities therein representative of the interference between said beams, and
   means for applying an electric potential to said member to establish an electric field therein oriented relative to the polar axis of said member so that said field and said light beams interact in said member to increase the sensitivity thereof to said light beams and thereby increase the amplitude of said refractive index inhomogeneities.

2. The apparatus of claim 1 wherein the strontium barium niobate has a composition $Sr_xBa_{1-x}Nb_2O_6$ with x having values in the range from .25 to .75.

3. A method for reconstructing an image of an object recorded in a polar crystalline storage medium as a pattern of refractive index inhomogeneities resulting from the interference between first and second coherently related beams angularly displaced from one another and incident on said medium in at least partially super-imposed relation under the influence of an electric potential applied to said medium, comprising the steps of
   illuminating the storage medium with a coherent beam of light,
   simultaneously applying an electric potential to the storage medium, and
   varying the amplitude of the applied electric potential to control the intensity of the reconstructed image whereby under a condition in which the electric potential is reduced to zero the image intensity reduces substantially zero.

4. The method of claim 3 wherein the storage medium is a poled crystalline member.

5. The method of claim 4 wherein the coherent beam of light is plane polarized parallel to the extraordinary index of the storage medium.

6. A holographic image reconstructing apparatus comprising
   a polar crystalline storage medium having an image representative pattern recorded therein in the form of refractive index inhomogeneities resulting from interference between a pair of coherently related light beams angularly displaced from one another and incident on the medium in at least partially superposed relation under the influence of an electric potential applied thereto for establishing an electric field in the medium oriented relative to the polar axis thereof so that the beams and the field interact to produce said inhomogeneities,
   means for illuminating the storage medium with a coherent reconstructing light beam having a propagational axis collinearly aligned with one of said recording beams,
   means for applying to said medium simultaneously with said reconstructing beam an electric potential for establishing in the medium an electric field oriented similarly to the field used in recording said inhomogeneities, and
   means for varying the amplitude of the applied electric potential to control the intensity of the reconstructed image whereby under a condition in which the electric potential is reduced to zero the image intensity reduces substantially to zero.

7. The apparatus of claim 6 wherein the storage medium exhibits ferroelectric properties.

8. The apparatus of claim 6 wherein the electric field is oriented parallel to the polar axis of the storage medium.

9. The apparatus of claim 6 wherein the propagational axis of the reconstructing beam is substantially transverse to the polar axis of the storage medium.

10. The apparatus of claim 6 wherein the reconstructing beam is plane polarized parallel to the extraordinary index of the storage medium.

11. The apparatus of claim 10 wherein the electric field is oriented parallel to the polar axis of the storage medium.

12. The apparatus of claim 11 wherein the propagational axis of the reconstructing beam is substantially transverse to the polar axis of the storage medium.

13. A method for reconstructing an image from a hologram capable of being recorded in a polar crystalline storage medium as a pattern of refractive index inhomogeneities established therein by light beams, comprising the steps of:
   illuminating the storage medium with a pair of coherently related light beams angularly displaced from one another and incident on said medium in at least partially superposed relation and simultaneously applying an electric potential to the storage medium to establish an electric field therein oriented relative to the polar axis of the medium so that the field and light beams interact in the medium to produce said refractive inhomogeneities for recording the hologram, illuminating the storage medium subsequent to recording of the hologram with a coherent reconstructing light beam having a propagational axis collinearly aligned with one of said recording beams, applying to said medium simultaneously with said reconstructing beam an electric potential for establishing in the medium an electric field oriented similarly to the field used in recording the refractive index inhomogeneities, and varying the amplitude of the applied electric potential to control the intensity of the reconstructed image whereby under a condition in which the electric potential is reduced to zero the image intensity reduces substantially to zero.

14. Apparatus for reconstructing an image from a hologram capable of being recorded in a polar crystalline storage medium as a pattern of refractive index inhomogeneities established therein by light beams, comprising means for illuminating the storage medium with a pair of coherently related light beams angularly displaced from one another and incident on said medium in at least partially superposed relation, means for applying to said member simultaneously with said pair of coherently related beams an electric potential for establishing in the medium an electric field oriented relative to the polar axis thereof so that the field and light beams interact to produce said refractive index inhomogeneities for recording the hologram, means for illuminating the storage medium, subsequent to recording the hologram, with a coherent reconstructing light beam having a propagational axis collinearly aligned with one of said recording beams, means for applying to said medium simultaneously with said reconstructing beam an electric potential for establishing in the medium an electric field oriented similarly to the field used in recording the refractive index inhomogeneities, and means for varying the amplitude of the applied electric potential to control the intensity of the reconstructed image whereby under a condition in which the electric potential is reduced to zero the image intensity reduces substantially to zero.

* * * * *